United States Patent [19]

Mayer

[11] 4,183,591
[45] Jan. 15, 1980

[54] RECIRCULATING BEARING OIL FILTER ASSEMBLY

[75] Inventor: Donald K. Mayer, Bloomington, Minn.

[73] Assignee: Thermo King Corporation, Minneapolis, Minn.

[21] Appl. No.: 920,899

[22] Filed: Jun. 29, 1978

[51] Int. Cl.² ............................................. F16C 33/66
[52] U.S. Cl. .................................... 308/187; 210/222
[58] Field of Search ............ 308/187, 76, 78, 92–105, 308/194, 191, 211, 214, DIGS. 2–5, DIG. 8, 13, 14; 210/352, 416 L, 168, 222; 192/103 B

[56] References Cited

U.S. PATENT DOCUMENTS

| | | | |
|---|---|---|---|
| 1,685,517 | 9/1928 | Baldwin | 308/187 X |
| 2,469,846 | 5/1949 | Roth et al. | 308/DIG. 5 |
| 2,914,178 | 11/1959 | Edelen | 210/222 |
| 3,170,872 | 2/1965 | Balogh et al. | 210/352 X |
| 3,869,391 | 3/1975 | Kramer | 210/222 |
| 3,941,012 | 3/1976 | Mayer | 192/103 B X |

*Primary Examiner*—Douglas C. Butler
*Attorney, Agent, or Firm*—F. A. Winans

[57] ABSTRACT

A readily removable and serviceable filter assembly in an oil recirculation path of a bearing lubrication system is shown wherein the oil passing through the bearing to lubricate the bearing surfaces is returned to an interior reservoir through a stationary passage having a replaceable bearing oil filter assembly of multiple interengaging components to form a generally unitary assembly.

4 Claims, 3 Drawing Figures

RECIRCULATING BEARING OIL FILTER ASSEMBLY

BACKGROUND OF THE INVENTION

1. Field of the Invention

This invention relates to an oil recirculation system for returning the bearing lubricating oil purged through the bearing during rotation to an oil reservoir to maintain the bearing surfaces lubricated, and more particularly, to such a system wherein the oil is returned through a stationary passage housing a readily removable oil filter assembly therein.

2. Description of the Prior Art

It is well known in a bearing lubrication system to provide a reservoir of oil adjacent the bearing to cause the oil to become deposited on the bearing and lubricate it. However, the centrifugal force at the rolling bearing surfaces causes the lubricating oil to be expelled from the supply reservoir. Tapered roller bearings have a special lubricating problem due to their conical shape. Such bearings produce a pumping action from the apex side outward toward the open end of the cone. One manner of maintaining the bearing surface wetted by the oil is to provide a seal on the side of the bearing opposite the reservoir and, once the volume defined by the seal and the bearing receives a certain amount of the oil, the bearing will no longer provide sufficient pumping action from the reservoir and will have oil on both sides at sufficient depth to maintain the bearing lubricated. This requires an excess oil fill to the reservoir causing a heat build-up because of excessive oil churning. Such a sealed volume for trapping the oil is shown in U.S. Pat. No. 3,941,012, of common assignee to the present invention, and directed to an in-line motor internal combustion engine-compressor drive mechanism. The tapered roller bearings of this apparatus tend to purge the lubricant from the inner rotor cavity in the above-described manner.

An alternative well known method of maintaining the bearing surface wetted with lubricant is to recirculate the oil purged by the pumping action of the tapered roller bearing back into the oil reservoir, through suitable passages. This has the advantage of requiring less lubricant, but the assembly generally requires a greater number of parts with close tolerance machining to provide the oil passages. U.S. Pat. No. 561,028 shows an early application of such a bearing oil recirculating arrangement.

SUMMARY OF THE INVENTION

The present invention is directed to a bearing oil recirculation system incorporating therein an easily replaceable oil filtering means comprising multiple separate components assembled in engaging relationship to provide a substantially unitary assembly. The lubricating oil continuously flows through the bearing and directed back into the oil reservoir through an axial bore in a stationary shaft member. The oil filter assembly is disposed in the bore of the shaft to intercept the flow and filter particulate matter from the oil. The filter assembly includes a filter retained in proper position within the bore by a coil spring, one end of which frictionally encircles the filter and the opposite end frictionally and/or magnetically engaging a threaded plug closing the bore of the shaft. The plug, spring, and filter member are engaged such that they form a generally unitary assembly whereby threading the plug into the open end of the bore biases the filter into seating engagement within the bore to prevent oil leakage around the filter. Also, the plug is magnetic to attract and retain metallic particles in the oil that are small enough to pass through the filter, but would otherwise cause excessive wear on the bearing surfaces if they continued to circulate in the oil, and also attracts and retains larger particles that plug the filter to extend the effective life of the filter.

DESCRIPTION OF THE PREFERRED EMBODIMENT

Figure 1:
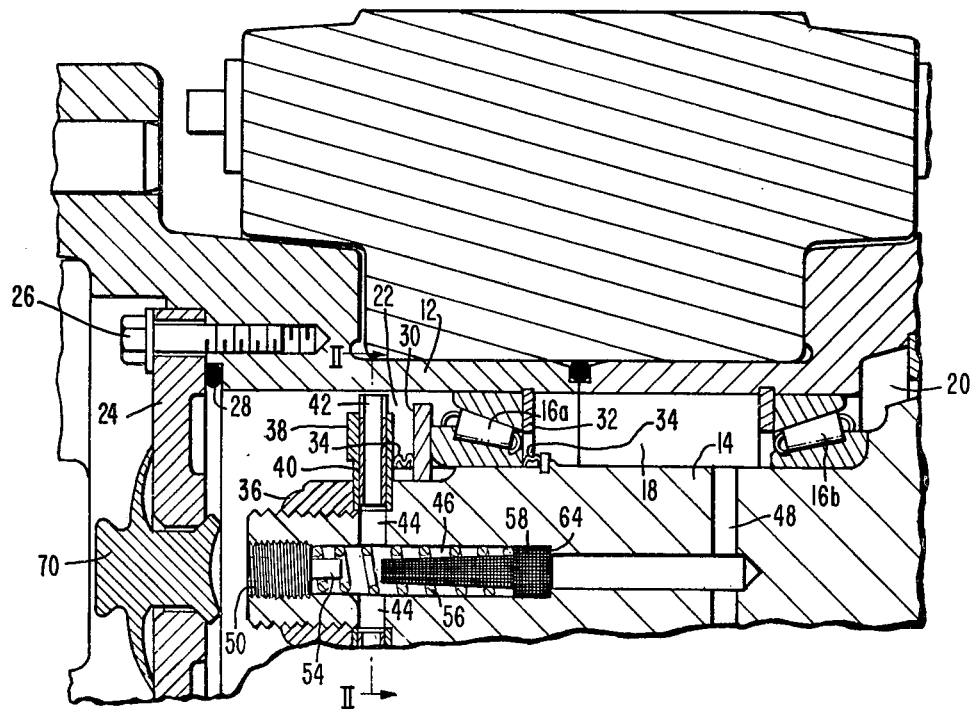
FIG. 1 is a partial cross-sectional view of a drive having a bearing oil recirculation arrangement and a filter assembly disposed therein according to the present invention.
Figure 2:
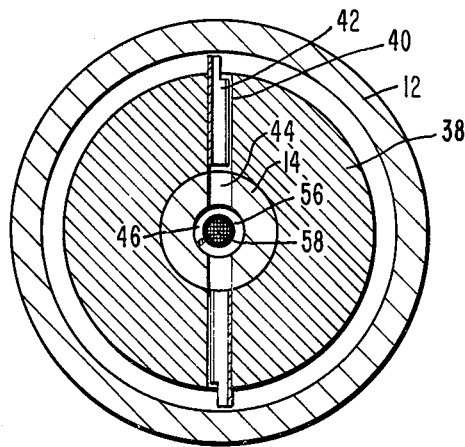
FIG. 2 is a view along lines II—II of FIG. 1.

The present invention is well suited for use in an in-line motor internal combustion engine/compressor drive mechanism, such as fully described in the above-referenced co-owned patent, which is herein incorporated by reference for its description of such drive mechanism. However, referring to FIG. 1, it is sufficient to note that the bearings and the lubrication system which are the subject of the present invention are generally associated with the electric motor 10 of the above-referenced drive. Thus, electric motor 10 is shown to have a rotor 12 defining an axial cavity in which a drive shaft 14 extends from and is supported by the engine (not shown). The rotor 12 is supported by the drive shaft 14 on axially spaced tapered roller bearings 16 (i.e., an outboard bearing 16a and an inboard bearing 16b). The rotor 12 is thus free to rotate while the shaft 14 remains stationary under certain drive conditions, as explained in the referenced patent.

The annular area between the rotor 12 and shaft 14, and bounded axially by the bearings 16, is referred to as the inner rotor cavity 18 and provides a reservoir for the lubricating oil for the bearings 16. The rolling action of the bearings 16a, 16b whenever the rotor 12 rotates and the shaft 14 remains stationary causes the oil to be pumped through the bearings from within the cavity 18 to respective spaces on the opposite side of the bearings. The oil passing through the inboard bearing 16b will collect in a sealed space 20 and once collected to a sufficient depth, will maintain that bearing surface wetted, even though no more oil is permitted to pass through. However, according to the present invention, the oil flowing through the outboard bearing 16a is received in an outer rotor cavity 22 formed by a rotor cover plate 24 secured over the axially open end of the rotor, as by bolts 26 and an O-ring 28. The oil in this cavity, under the influence of centrifugal force is forced against the cylindrical wall of the rotor 12.

The outboard end of the shaft 14 has a washer 30 engaging the outer face of the bearing 16a to axially retain the bearing between the washer 30 and an internal retaining washer 32. A compression ring 34 disposed against the washer 30 maintains a resilient compressive force on the bearing 16a under the force of a jam nut 36 threaded onto the free end of the shaft 14 and, in turn, engaging a thrust washer 38, and applying a compressive force on the compression ring 34. The thrust washer 38 has a radially extending aperture 40 therethrough into which is inserted an oil pick-up tube 42 such as a commercial roll pin having an axial notch re ground in the outer end so as to be open to scoop the oil thereinto. The tube 42 is in alignment with a radially extending aperture 44 extending from the outer surface of the shaft 14 to communicate with an axially extending bored cavity 46 therein. A second radially extending opening 48 extends through the shaft 14 to place the inner rotor cavity 18 in flow communication with the bored cavity 46 in the shaft. The notched end 43 of the oil pick-up tube 42 faces into the direction of rotation of the rotor and is disposed relatively closely adjacent the inner cylindrical surface of the rotor. When the shaft 14 is stationary and the rotor 12 is rotating, the pick-up tube 42 intercepts the oil that is disposed on this inner cylindrical surface. This oil is directed through the tube 42 into the bored cavity 46 of the shaft and, under the pumping pressure or head of the incoming oil, is forced outwardly through opening 48 into the inner rotor cavity 18. Thus, it is seen that as the oil flows from the inner rotor cavity through the bearing 16a, it is returned to the cavity through the oil pick-up tube 42 and the inner bored cavity 46 for continuous circulation.

Figure 3:
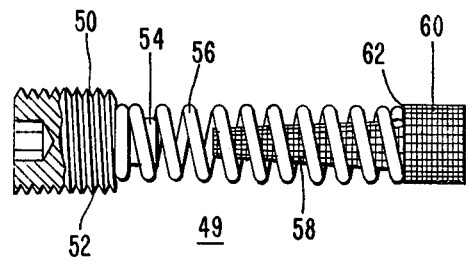
FIG. 3 is a view of the filter assembly of the present invention.

Referring now to FIGS. 1 and 3, a filter assembly 49 is shown which, as clearly shown in FIG. 1, is normally disposed within the axial bored cavity 46 of the shaft 14 and, when in proper position, is generally between the radially extending openings 44 and 48 so as to intercept the oil flow, forcing it to be passed through the filter assembly.

The filter assembly 49 includes, as viewed from left to right in FIG. 3, a threaded plug 50 having an externally threaded head 52 and a reduced diameter axially extending neck portion 54. A spirally wound coil spring member 56, having an internal diameter slightly less than the outer diameter of the neck 54, is expanded at one end to frictionally engage and encircle the neck portion 54. A conically configured, porous filter element 58 is similarly inserted in the opposite end of the coil spring as the coil spring frictionally engages the filter at a diameter slightly greater than the inner diameter of the spring for secure engagement. The base-end of the conical filter 58 is enlarged as at 60 to provide a cylindrical portion defining an annular shoulder 62 for abutting engagement with the spring with the circular base in turn abutting a reduced diameter shoulder 64 in the bored cavity 46. It is to be noted that the relaxed, unbiased axial length of the coil spring 56 is greater than the axial length that the spring is forced to assume in the assembled position within the cavity so that there is an inherent biasing force to maintain the filter 58 seated on the reduced shoulder 64. Thus, the frictional engagement of the threaded plug 50 at one end of the spring and the conical filter 56 at the opposite end of the spring provides a substantially unitary subassembly that can be readily inserted and properly seated and retained within the oil return cavity 46.

The conical filter element 58 has a porous consistency that permits the oil to pass therethrough with the foreign matter larger than the pores being filtered and removed from the oil. Such a filter could for example be formed of a sintered brass or sintered stainless steel, a compressed fiber metal, a porous ceramic, or a formed woven wire screen. Further, it is to be noted that the threaded plug is preferably a permanent magnet so as to attract and retain ferritic or magnetic foreign particles suspended in the oil. Thus particles that would otherwise be small enough to pass through the filter, but whose presence could increase wear on the bearing surfaces along with larger particles that would otherwise block or clog the filter are retained by the plug 50. The oil flow being relatively small has generally insufficient velocity to flush such particles from the plug. Also the magnetic plug produces additional or an alternative securing force between the plug 50 and the spring 56 for the unitary relationship desired for assembly of the filtering unit into the bored cavity.

Thus, the filter assembly is disposed in the oil recirculating axial bore and traps the foreign particulate matter in the bearing oil and, after a period of use, must be removed to be cleaned or replaced. Removal is readily accomplished by removing an axial end plug 70 from the rotor cover plate 24 for tool access to the threaded plug 50. Unscrewing the plug permits axial removal of the plug-spring-filter subassembly and another such subassembly can be easily inserted, or in the alternative, the plug and spring can be cleaned and the porous filter readily replaced therein by a similar filter and the reassembled unit then inserted into place.

I claim:

1. A rotor member having an axial cavity defining an inner cylindrical wall; a shaft member; bearing means for coaxially rotatably mounting said rotor on said shaft with said inner wall, said shaft member and said bearing means defining an oil containing reservoir; an open ended axial bore in said shaft extending from one side of said bearing means to the opposite side thereof and defining an internal reduced diameter shoulder, and an oil flow path through said shaft for placing said reservoir in oil flow communication with said axial bore; an oil pick-up means secured to said shaft for directing oil accumulated on said inner wall of said rotor opposite said reservoir into said axial bore; a porous filtering media member disposed within said axial bore intermediate said oil pick-up into said bore and said flow path therefrom to said reservoir and defining a base portion for abutting said internal shoulder; an end plug for closing said open end of said bore; and, spring means extending between said end plug and said filtering media member and resilient urging said base portion of said filtering media member into substantially sealing engagement with said shoulder when said plug is inserted within said bore.

2. Structure according to claim 1 wherein said plug is magnetic.

3. Structure according to claim 1 wherein said spring is a coil spring and said plug has an axially extending reduced diameter portion and said filter medium also has an axially extending reduced diameter portion whereby opposite ends of said spring are expanded to engage said reduced diameter portions of said plug and filter respectively to provide a unitary assembly of such parts.

4. Structure according to claim 3 wherein said plug and bore are complimentary threaded for retention of the plug within the open end of said bore.

* * * * *